Dec. 4, 1945.   M. E. GARRISON   2,390,093
AIRPLANE WING DEICING MEANS
Filed March 16, 1944
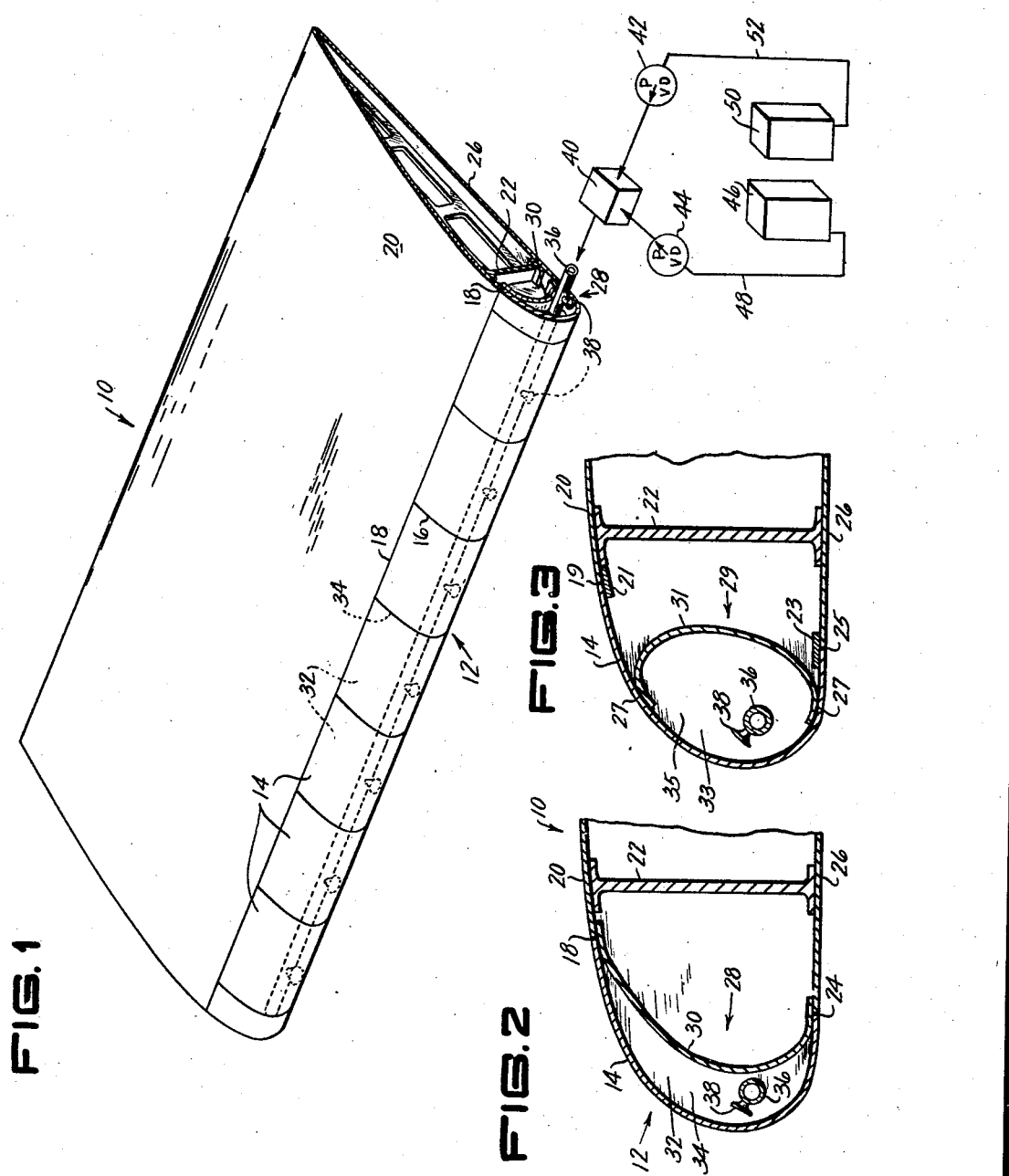
INVENTOR
MURRAY ED GARRISON
BY
ATTORNEYS Patented Dec. 4, 1945

2,390,093

UNITED STATES PATENT OFFICE 2,390,093

AIRPLANE WING DEICING MEANS

Murray Ed Garrison, Dayton, Ohio

Application March 16, 1944, Serial No. 526,796

8 Claims. (Cl. 244—134)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to ice preventing or removing equipment for aircraft.

Broadly, the object of the invention is to provide means for preventing the formation of ice on the leading edges and upper surfaces of airplane airfoils, or for removing such formation therefrom where it has already formed.

More specifically, an object of the invention is to provide an airfoil in which the leading edge is formed of a smooth but relatively porous metal and then provide means to cause a minute quantity of anti-ice fluid to exude from the porous metal and distribute itself uniformly over its outer surface, thereby preventing the formation of ice thereon.

Equipment for de-icing aircraft airfoils by spreading a layer of anti-ice fluid over the leading edges is broadly old, as for instance, in Patent No. 2,249,940 of July 22, 1941, where a covering of woven fabric overlies the surface which is to be protected and an anti-ice fluid is forced by pressure through the interstices of the fabric and allowed to spread by capillary attraction over the outer surface.

A covering of such woven fabric is, however, objectionable for many reasons, one being that its relatively rough surface provides means upon which the ice may take firm hold, another that such a surface retards the free flow of air and consequently increases the thickness of the boundary layer. Moreover, due to the impact pressures and other forces acting in the leading edges of the airfoils, the securing of a layer of yieldable fabric to the foil proper with any degree of permanence becomes a serious problem.

It is therefore another object of the invention to construct the leading edge of the airfoil of a continuous porous metal sheet, not as a covering over the edge of the foil but as a part of the foil itself, then, since this procedure provides an enclosure with a porous front wall, using such enclosure as a receptacle for receiving the anti-icing fluid under pressure, whereby it may be made to exude from the forward surface.

Since a considerable portion of the leading edge of the wing of an aircraft in flight is subject to a relatively high impact pressure which tends to induce moisture condensation and hold it to the surface where it freezes, it is another object of the invention to maintain sufficient pressure within the enclosure which contains the de-icing fluid to counteract this impact pressure tendency.

While the primary intention is to so construct and use the de-icing equipment embodying the invention that it will prevent the formation of ice, it is a further object to so construct the de-icing fluid enclosure that it may be put under sufficient pressure, above that which is normally used, to force the ice off the foils after it has taken firm hold, where that situation has inadvertently been allowed to arise.

Since apparatus embodying the invention may be used on combat aircraft, where the leading edge of an airfoil may be punctured, it is another object of the invention to divide the enclosed space within the leading edge into a series of separate compartments which are pressure tight except for the porosity of the front wall, then so distributing the compressed de-icing fluid that when one or more compartments are punctured it will still be possible to deliver fluid under pressure to the others.

Insofar as known in the art, attempts to prevent ice formation on the leading edge of an airfoil by spreading a layer of antifreeze fluid over the surface, have taken a form substantially as shown in Patent No. 2,249,940, supra, where the antifreeze which is delivered to a point on the wick covering and allowed to distribute itself over the surface by capillary attraction is in liquid form. Such a construction does not lend itself to removal of a heavy layer of ice after it has once formed on the edges of the airfoils, for the reason that, if pressure sufficient to break up a layer of ice several inches thick were applied to the liquid antifreeze, too much of the liquid would be forced through the wicking and lost if and when the ice layer did let go. Moreover, the pressure would not be distributed uniformly over the entire leading edge and would possibly result in spotty removal.

It is therefore another object of this invention to provide controllable pressure atomizing or vaporizing means for the de-icing equipment whereby, for normal operation, the enclosure, of which the front wall is the leading edge of the airfoil, may be kept filled with the anti-icing fluid in an atomized state and preferably under a relatively low pressure, that is, just sufficient to keep a thin layer of the fluid in liquid form on the outside surface, but whereby, when a layer of ice has for some reason already formed, a sufficiently higher pressure may be applied to break up such layer and force it from the airfoil surface.

Many other objects and many advantages will become evident as the invention is more fully described and reference is made to the drawing, wherein—

Fig. 1 is a schematic view of an airfoil equipped with de-icing apparatus embodying my invention.

Fig. 2 is a cross section taken through the airfoil of Fig. 1 on the line 2—2.

Fig. 3 is a cross section of a de-icer construction which may be substituted for that shown in Fig. 2.

Referring now to the drawing, an airfoil 10 has the forward wall 12 which constitutes its leading edge made up of a series of smooth but relatively porous sintered metal plates 14 curved appropriately for the particular air foil shown and joined together as at 16. The upper edges of plates 14 may preferably be butt welded at 18 to the top plate 20 of the foil near the main beam 22, but the lower edges of the plates may preferably be stopped off somewhat further forward and butt welded as at 24 to the bottom plate 26 of the foil. Plates 14, when thus joined to each other and to the top and bottom plates of the foil, form a continuous wall which constitutes the leading edge 12 of the foil.

Close in back of the wall 12 is another wall 28 which may be made up of a series of impervious metal plates 30 which are preferably, although not necessarily, of the same horizontal dimension as plates 14. Plates 28 may preferably be so made and so welded in place that they will lap over the butt welded joint 18 at the top and the butt welded joint 24 at the bottom.

Forming and joining the plates 14 and 30, as above indicated, leaves space between the walls 12 and 28. This space is preferably then divided into a series of compartments 32 by transverse partitions 34, also of some suitable impervious metal.

The securing together of the front plates 14 and back plates 30 and securing them to the top and bottom plates 20 and 26, and the securing of the partitions 34 to the plates, may be accomplished in any manner which will make a tight joint, but since the construction involves the joining of several dissimilar metals, cycle welding is currently the best known method of joining the several parts.

A small pipe 36 is provided to supply an anti-icing medium to the several compartments 32. Pipe 36 extends the length of the foil and passes through all of the partitions 34, the partitions being pressure sealed to the pipe where it passes through them.

For communicating with the compartments 32, the pipe 36 has a series of small longitudinally spaced orifices 38, one for each compartment. In order to maintain a relatively uniform pressure in all compartments, each succeeding orifice is made larger in diameter than the one next preceding when progressing from right to left, the increase in size being proportional to the pressure drop from one compartment to the next. The size of the orifices 38 may preferably also be governed by the degree of porosity of the sintered metal plates 14. Sintered metal sheets are procurable in widely varying degrees of porosity. Experimental tests have shown, however, that good results may be obtained with sintered metal sheets which passed air at the rate of .125 c. f. m. per sq. in. of surface at a pressure drop of 39 inches of mercury. Other experimental tests have shown that while a pressure of about 45 p. s. i. is required to break up a heavy layer of ice when air alone is used, a pressure of 10 p. s. i. is sufficient for the purpose when atomized or vaporized de-icing fluid is mixed with the air. It is of course important to use as low a pressure as possible in order that a thinner, and therefore lighter, sheet of sintered metal will suffice.

The apparatus for supplying the air pressure and the atomized or vaporized de-icing fluid for the compartments 32, comprises a mixer 40, which is supplied with air or other suitable gas by the pump 42, and with oil or any other suitable de-icing fluid by the pump 44. A supply tank 46 is connected by piping 48 to the suction side of the pump 44. A tank 50 may be connected by piping 52 to the pump 42 when a gas other than air is being used. The pumps 42 and 44 may be driven by any suitable power means controllable from the cockpit. There may preferably be at least two pump speeds, one a relatively low speed for producing the normal pressure within the compartment 32 which is sufficient to cause a thin layer of anti-icing fluid to exude from the sintered metal front wall and spread itself over the entire leading edge, and another and faster speed for producing a pressure in the compartments several times as great as the normal operating pressure, the latter being provided for forcing a heavy layer of ice from the foil when it has already formed thereon.

The mixer 40 may include an atomizer for the de-icing fluid, in which case the fluid is suspended in the air in an atomized state, or the apparatus may include a heating means for the fluid or air, or both, in which case the fluid may be first vaporized then mixed with the hot or cold air or other gaseous medium. The object is to normally maintain a sufficient layer of the de-icing fluid on the inside of the front wall 12 to insure that when the relatively low air pressure carries it through the pores of the sintered metal, a sufficient layer of the fluid will be maintained on the outer surface in spite of the tendency of the elements to remove it, whereby, when it becomes necessary to considerably increase the pressure to force off a layer of ice already formed on the surface, no great amount of de-icing fluid will be lost, or at least far less will be lost than would be the case if the high pressure necessary to break up a thick layer of ice were applied to a chamber 32 which was completely filled with an anti-icing fluid in liquid form.

Fig. 3 shows alternate construction for providing compartments 33, separated by partitions 35. A convex rear wall 29, made of plates 31 is substituted for the concave wall 28 composed of plates 30. Butt welded joints 19 and 25 are reinforced by strips 21 and 23. The wall 29 is welded at the ends 27 to the sintered metal front wall 14.

When indicated by weather conditions, the de-icing apparatus should preferably be put into operation before any ice has formed on the airfoils, by pumping the air and de-icing fluid mixture into the compartments 32 at the normal pressure, thus preventing any ice forming on the forward surfaces. The high pressure need be applied only when a relatively heavy layer of ice has formed unnoticed by the pilot and such layer of ice is to be removed.

Having described my invention, I claim:

1. In an airfoil, a rigid outer wall at the leading edge composed of a sheet of smooth porous metal, a second wall of impervious material in back of the outer wall forming an enclosure between the two said walls, and means for forcing a mixture consisting of a gaseous medium, and finely divided de-icing fluid under pressure into said enclosure.

2. An airfoil having a rigid leading edge the outer layer of which is formed of porous sheet metal, a wall in back of the rigid leading edge forming an enclosure between said wall and said rigid leading edge, and means for forcing a mixture of air and finely divided de-icing fluid under pressure into said enclosure.

3. An airfoil having a rigid leading edge the outer layer of which is made of a sheet of porous metal having a smooth outer surface, a wall of impervious material in back of the leading edge forming an enclosure between said wall and said leading edge, and means for mixing air and finely divided de-icing fluid and forcing it into said enclosure under pressure.

4. The combination in an airfoil of a rigid leading edge made of an externally smooth sheet of porous metal, an impervious wall in back of the leading edge secured top and bottom to said leading edge thus forming a narrow enclosure between said leading edge and said wall, and means for forming a mist of anti-icing fluid and carrying it into said enclosure by air under pressure.

5. An airfoil having a rigid leading edge the outer layer of which is composed of externally smooth porous sheet metal, an impervious wall in back of said leading edge forming an enclosure between said wall and said leading edge, means dividing said enclosure into a plurality of separate compartments, and means for carrying a mist of de-icing fluid into said compartments by air under pressure.

6. An airfoil having a rigid leading edge formed of an externally smooth sheet of permeable material, a wall formed of a sheet of impervious material close in back of said leading edge thereby forming an enclosure between said sheets, partitions dividing said enclosure into a plurality of compartments, and means for maintaining a mixture of air and a mist of anti-icing fluid at a substantially uniform pressure in all of said compartments.

7. An airfoil having its leading edge formed of an externally smooth sheet of sintered metal, an impervious sheet metal wall close in back of said leading edge and joined at its edges to said sintered metal thereby forming an enclosure between said sheets, impervious partitions dividing said enclosure into a plurality of compartments, means for maintaining a mixture of air and a vapor of de-icing fluid at substantially equal pressure in all of said compartments, and means for varying said pressure.

8. An anti-icing airfoil having the entire leading edge formed of an externally smooth sheet of permeable metal, compartments within said said foil adjacent said leading edge each having one side closed only by a part of said permeable sheet, means for maintaining a gaseous mixture under uniform pressure within said compartments, and means to control said pressure.

MURRAY ED GARRISON.